(12) United States Patent
Huang et al.

(10) Patent No.: US 10,277,378 B2
(45) Date of Patent: Apr. 30, 2019

(54) WAKE-UP RECEIVER BAND AND CHANNEL NEGOTIATION

(71) Applicant: Intel IP Corporation, Santa Clara, CA (US)

(72) Inventors: Po-Kai Huang, San Jose, CA (US); Minyoung Park, Portland, OR (US); Robert J. Stacey, Portland, OR (US)

(73) Assignee: Intel IP Corporation, Santa Clara, CA (US)

( * ) Notice: Subject to any disclaimer, the term of this patent is extended or adjusted under 35 U.S.C. 154(b) by 110 days.

(21) Appl. No.: 15/468,871

(22) Filed: Mar. 24, 2017

(65) Prior Publication Data

US 2018/0069683 A1    Mar. 8, 2018

Related U.S. Application Data

(60) Provisional application No. 62/383,806, filed on Sep. 6, 2016.

(51) Int. Cl.
*H04L 5/00* (2006.01)
*H04W 52/02* (2009.01)
*H04W 84/12* (2009.01)

(52) U.S. Cl.
CPC ....... *H04L 5/0092* (2013.01); *H04W 52/0222* (2013.01); *H04W 52/0229* (2013.01); *H04W 84/12* (2013.01); *Y02D 70/00* (2018.01); *Y02D 70/10* (2018.01); *Y02D 70/1262* (2018.01); *Y02D 70/1264* (2018.01); *Y02D 70/14* (2018.01); *Y02D 70/142* (2018.01); *Y02D 70/144* (2018.01)

(58) Field of Classification Search
CPC ......... H04W 52/0229; H04W 52/0235; H04W 84/12; H04W 52/0212; H04W 52/0216; H04W 52/028; H04W 52/0225; H04W 16/14; H04W 4/06; H04W 52/02; H04W 52/0238; H04W 52/0293; H04W 68/005
See application file for complete search history.

(56) References Cited

U.S. PATENT DOCUMENTS

2017/0064625 A1* 3/2017 Sampath .......... H04W 52/0216
2017/0332327 A1* 11/2017 Fang ..................... H04L 5/0007

\* cited by examiner

*Primary Examiner* — Golam Sorowar
(74) *Attorney, Agent, or Firm* — Schwegman Lundberg & Woessner, P.A.

(57) ABSTRACT

Embodiments of a LP-WUR (low-power wake-up radio) wake-up packet acknowledgement procedure are generally described herein. A first wireless device encodes for transmission of a wake-up packet of a LP-WUR to a second wireless device, the wake-up packet to wake up a WLAN (wireless local area network) radio of the second wireless device. Upon decoding a response frame from the second wireless device received during a predefined time period: the first wireless device encodes for transmission of a data packet to the WLAN radio of the second wireless device. Upon failing to receive the response frame from the second wireless device during the predefined time period: the first wireless device encodes for retransmission of the wake-up packet to the second wireless device.

20 Claims, 5 Drawing Sheets

WAKE-UP RECEIVER BAND AND CHANNEL NEGOTIATION

PRIORITY CLAIM

This application claims priority under 35 U.S.C. § 119 to U.S. Provisional Patent Application Ser. No. 62/383,806, filed Sep. 6, 2016, and titled, "BAND AND CHANNEL NEGOTIATION," which is incorporated herein by reference in its entirety.

TECHNICAL FIELD

Embodiments pertain to wireless networks. Some embodiments relate to wireless local area networks (WLANs) and Wi-Fi networks including networks operating in accordance with the IEEE 802.11 family of standards, such as the IEEE 802.11ac standard or the IEEE 802.11ax study group. Some embodiments relate to a low-power wake-up receiver (LP-WUR). Some embodiments relate to band and channel negotiation.

BACKGROUND

In recent years, applications have been developed relating to social networking, Internet of Things (IoT), wireless docking, and the like. It may be desirable to design low power solutions that can be always-on. However, constantly providing power to a wireless local area network (WLAN) radio may be expensive in terms of battery life.

DETAILED DESCRIPTION

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

Figure 1:
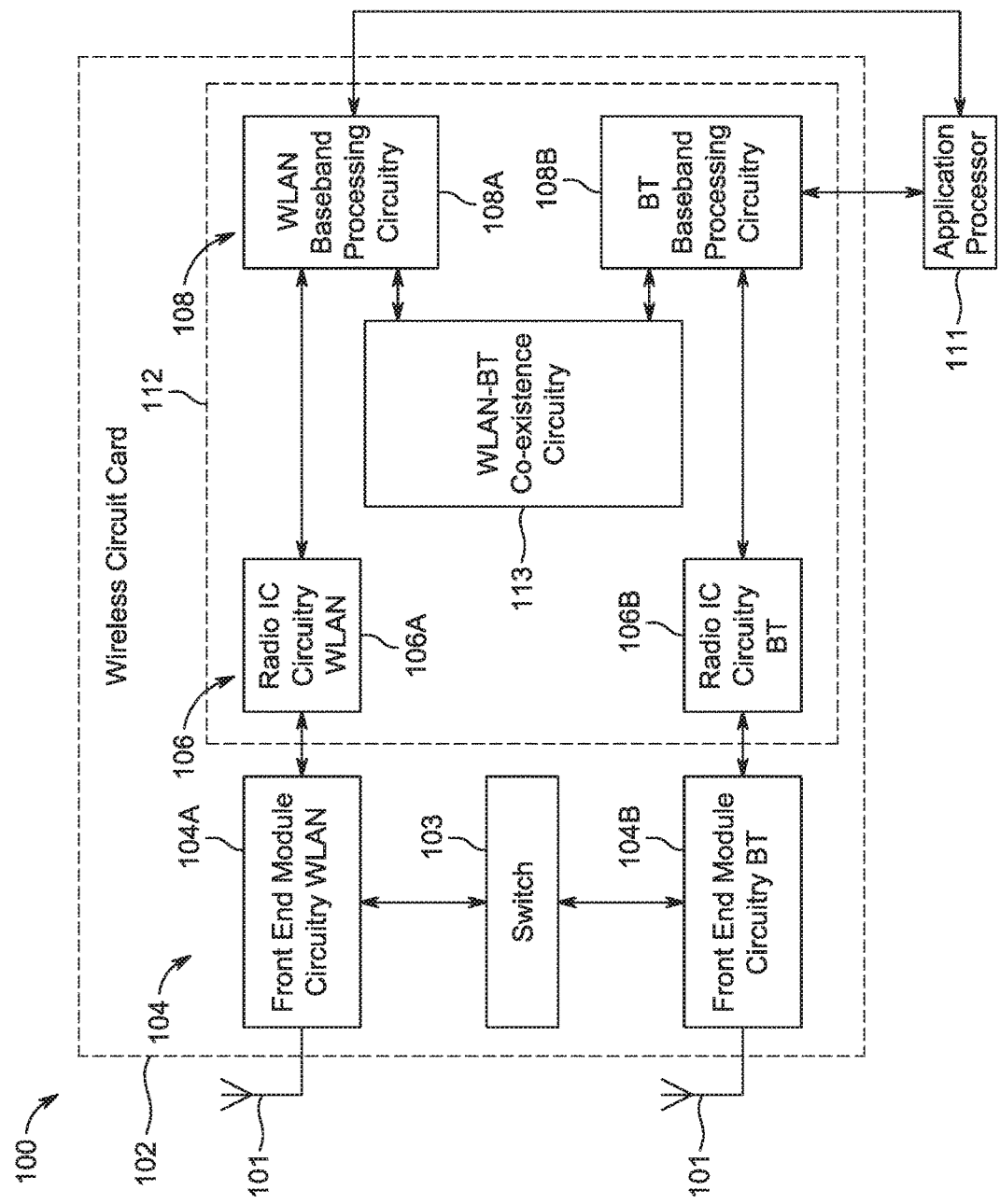
FIG. 1 is a block diagram of a radio architecture, in accordance with some embodiments.

FIG. 1 is a block diagram of a radio architecture 100 in accordance with some embodiments. Radio architecture 100 may include radio front-end module (FEM) circuitry 104, radio IC circuitry 106 and baseband processing circuitry 108. Radio architecture 100 as shown includes both Wireless Local Area Network (WLAN) functionality and Bluetooth (BT) functionality although embodiments are not so limited. In this disclosure, "WLAN" and "Wi-Fi" are used interchangeably.

FEM circuitry 104 may include a WLAN or Wi-Fi FEM circuitry 104a and a Bluetooth (BT) FEM circuitry 104b. The WLAN FEM circuitry 104a may include a receive signal path comprising circuitry configured to operate on WLAN RF signals received from one or more antennas 101, to amplify the received signals and to provide the amplified versions of the received signals to the WLAN radio IC circuitry 106a for further processing. The BT FEM circuitry 104b may include a receive signal path which may include circuitry configured to operate on BT RF signals received from one or more antennas 101, to amplify the received signals and to provide the amplified versions of the received signals to the BT radio IC circuitry 106b for further processing. FEM circuitry 104a may also include a transmit signal path which may include circuitry configured to amplify WLAN signals provided by the radio IC circuitry 106a for wireless transmission by one or more of the antennas 101. In addition, FEM circuitry 104b may also include a transmit signal path which may include circuitry configured to amplify BT signals provided by the radio IC circuitry 106b for wireless transmission by the one or more antennas. In the embodiment of FIG. 1, although FEM 104a and FEM 104b are shown as being distinct from one another, embodiments are not so limited, and include within their scope the use of an FEM (not shown) that includes a transmit path and/or a receive path for both WLAN and BT signals, or the use of one or more FEM circuitries where at least some of the FEM circuitries share transmit and/or receive signal paths for both WLAN and BT signals.

Radio IC circuitry 106 as shown may include WLAN radio IC circuitry 106a and BT radio IC circuitry 106b. The WLAN radio IC circuitry 106a may include a receive signal path which may include circuitry to down-convert WLAN RF signals received from the FEM circuitry 104a and provide baseband signals to WLAN baseband processing circuitry 108a. BT radio IC circuitry 106b may in turn include a receive signal path which may include circuitry to down-convert BT RF signals received from the FEM circuitry 104b and provide baseband signals to BT baseband processing circuitry 108b. WLAN radio IC circuitry 106a may also include a transmit signal path which may include circuitry to up-convert WLAN baseband signals provided by the WLAN baseband processing circuitry 108a and provide WLAN RF output signals to the FEM circuitry 104a for subsequent wireless transmission by the one or more antennas 101. BT radio IC circuitry 106b may also include a transmit signal path which may include circuitry to up-convert BT baseband signals provided by the BT baseband processing circuitry 108b and provide BT RF output signals to the FEM circuitry 104b for subsequent wireless transmission by the one or more antennas 101. In the embodiment of FIG. 1, although radio IC circuitries 106a and 106b are shown as being distinct from one another, embodiments are not so limited, and include within their scope the use of a radio IC circuitry (not shown) that includes a transmit signal path and/or a receive signal path for both WLAN and BT signals, or the use of one or more radio IC circuitries where at least some of the radio IC circuitries share transmit and/or receive signal paths for both WLAN and BT signals.

Baseband processing circuity 108 may include a WLAN baseband processing circuitry 108a and a BT baseband processing circuitry 108b. The WLAN baseband processing circuitry 108a may include a memory, such as, for example, a set of RAM arrays in a Fast Fourier Transform or Inverse Fast Fourier Transform block (not shown) of the WLAN baseband processing circuitry 108a. Each of the WLAN baseband circuitry 108a and the BT baseband circuitry 108b may further include one or more processors and control logic to process the signals received from the corresponding WLAN or BT receive signal path of the radio IC circuitry 106, and to also generate corresponding WLAN or BT baseband signals for the transmit signal path of the radio IC circuitry 106. Each of the baseband processing circuitries 108a and 108b may further include physical layer (PHY) and medium access control layer (MAC) circuitry, and may further interface with application processor 111 for generation and processing of the baseband signals and for controlling operations of the radio IC circuitry 106.

Referring still to FIG. 1, according to the shown embodiment, WLAN-BT coexistence circuitry 113 may include logic providing an interface between the WLAN baseband circuitry 108a and the BT baseband circuitry 108b to enable use cases requiring WLAN and BT coexistence. In addition, a switch 103 may be provided between the WLAN FEM circuitry 104a and the BT FEM circuitry 104b to allow switching between the WLAN and BT radios according to application needs. In addition, although the antennas 101 are depicted as being respectively connected to the WLAN FEM circuitry 104a and the BT FEM circuitry 104b, embodiments include within their scope the sharing of one or more antennas as between the WLAN and BT FEMs, or the provision of more than one antenna connected to each of FEM 104a or 104b.

In some embodiments, the front-end module circuitry 104, the radio IC circuitry 106, and baseband processing circuitry 108 may be provided on a single radio card, such as wireless radio card 102. In some other embodiments, the one or more antennas 101, the FEM circuitry 104 and the radio IC circuitry 106 may be provided on a single radio card. In some other embodiments, the radio IC circuitry 106 and the baseband processing circuitry 108 may be provided on a single chip or integrated circuit (IC), such as IC 112.

In some embodiments, the wireless radio card 102 may include a WLAN radio card and may be configured for Wi-Fi communications, although the scope of the embodiments is not limited in this respect. In some of these embodiments, the radio architecture 100 may be configured to receive and transmit orthogonal frequency division multiplexed (OFDM) or orthogonal frequency division multiple access (OFDMA) communication signals over a multicarrier communication channel. The OFDM or OFDMA signals may comprise a plurality of orthogonal subcarriers.

In some of these multicarrier embodiments, radio architecture 100 may be part of a Wi-Fi communication station (STA) such as a wireless access point (AP), a base station or a mobile device including a Wi-Fi device. In some of these embodiments, radio architecture 100 may be configured to transmit and receive signals in accordance with specific communication standards and/or protocols, such as any of the Institute of Electrical and Electronics Engineers (IEEE) standards including, 802.11n-2009, IEEE 802.11-2012, 802.11n-2009, 802.11ac, and/or 802.11ax standards and/or proposed specifications for WLANs, although the scope of embodiments is not limited in this respect. Radio architecture 100 may also be suitable to transmit and/or receive communications in accordance with other techniques and standards.

In some embodiments, the radio architecture 100 may be configured for high-efficiency (HE) Wi-Fi (HEW) communications in accordance with the IEEE 802.11ax standard. In these embodiments, the radio architecture 100 may be configured to communicate in accordance with an OFDMA technique, although the scope of the embodiments is not limited in this respect.

In some other embodiments, the radio architecture 100 may be configured to transmit and receive signals transmitted using one or more other modulation techniques such as spread spectrum modulation (e.g., direct sequence code division multiple access (DS-CDMA) and/or frequency hopping code division multiple access (FH-CDMA)), time-division multiplexing (TDM) modulation, and/or frequency-division multiplexing (FDM) modulation, although the scope of the embodiments is not limited in this respect.

In some embodiments, as further shown in FIG. 1, the BT baseband circuitry 108b may be compliant with a Bluetooth (BT) connectivity standard such as Bluetooth, Bluetooth 4.0 or Bluetooth 5.0, or any other iteration of the Bluetooth Standard. In embodiments that include BT functionality as shown for example in FIG. 1, the radio architecture 100 may be configured to establish a BT synchronous connection oriented (SCO) link and/or a BT low energy (BT LE) link. In some of the embodiments that include functionality, the radio architecture 100 may be configured to establish an extended SCO (eSCO) link for BT communications, although the scope of the embodiments is not limited in this respect. In some of these embodiments that include a BT functionality, the radio architecture may be configured to engage in a BT Asynchronous Connection-Less (ACL) communications, although the scope of the embodiments is not limited in this respect. In some embodiments, as shown in FIG. 1, the functions of a BT radio card and WLAN radio card may be combined on a single wireless radio card, such as single wireless radio card 102, although embodiments are not so limited, and include within their scope discrete WLAN and BT radio cards In some embodiments, the radio-architecture 100 may include other radio cards, such as a cellular radio card configured for cellular (e.g., 3GPP such as LTE, LTE-Advanced or 5G communications).

In some IEEE 802.11 embodiments, the radio architecture 100 may be configured for communication over various channel bandwidths including bandwidths having center frequencies of about 900 MHz, 2.4 GHz, 5 GHz, and bandwidths of about 1 MHz, 2 MHz, 2.5 MHz, 4 MHz, 5 MHz, 8 MHz, 10 MHz, 16 MHz, 20 MHz, 40 MHz, 80 MHz (with contiguous bandwidths) or 80+80 MHz (160 MHz) (with non-contiguous bandwidths). In some embodiments, a 320 MHz channel bandwidth may be used. The scope of the embodiments is not limited with respect to the above center frequencies however.

Figure 2:
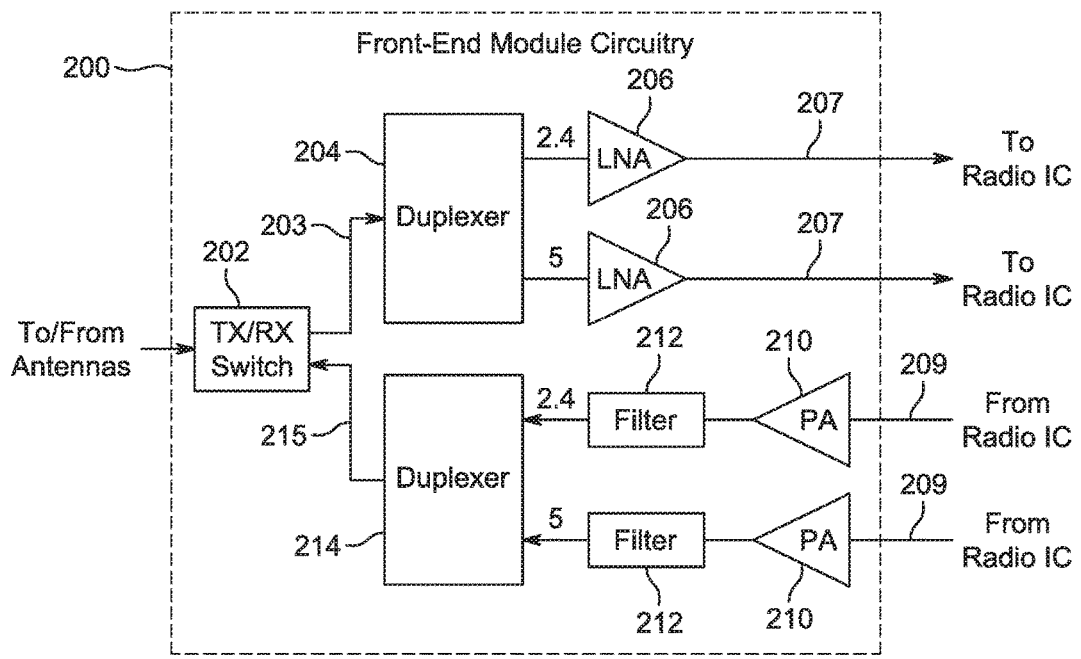
FIG. 2 illustrates a front-end module circuitry for use in the radio architecture of FIG. 1, in accordance with some embodiments.

FIG. 2 illustrates FEM circuitry 200 in accordance with some embodiments. The FEM circuitry 200 is one example of circuitry that may be suitable for use as the WLAN and/or BT FEM circuitry 104a/104b (FIG. 1), although other circuitry configurations may also be suitable.

In some embodiments, the FEM circuitry 200 may include a TX/RX switch 202 to switch between transmit mode and receive mode operation. The FEM circuitry 200 may include a receive signal path and a transmit signal path. The receive signal path of the FEM circuitry 200 may include a low-noise amplifier (LNA) 206 to amplify received RF signals 203 and provide the amplified received RF signals 207 as an output (e.g., to the radio IC circuitry 106 (FIG. 1)). The transmit signal path of the circuitry 200 may include a power amplifier (PA) 210 to amplify input RF signals 209 (e.g., provided by the radio IC circuitry 106), and one or more filters 212, such as band-pass filters (BPFs), low-pass filters (LPFs) or other types of filters, to generate RF signals 215 for subsequent transmission (e.g., by one or more of the antennas 101 (FIG. 1)).

In some dual-mode embodiments for Wi-Fi communication, the FEM circuitry 200 may be configured to operate in either the 2.4 GHz frequency spectrum or the 5 GHz frequency spectrum. In these embodiments, the receive signal path of the FEM circuitry 200 may include a receive signal path duplexer 204 to separate the signals from each spectrum as well as provide a separate LNA 206 for each spectrum as shown. In these embodiments, the transmit signal path of the FEM circuitry 200 may also include a power amplifier 210 and a filter 212, such as a BPF, a LPF or another type of filter for each frequency spectrum and a transmit signal path duplexer 214 to provide the signals of one of the different spectrums onto a single transmit path for subsequent transmission by the one or more of the antennas 101 (FIG. 1). In some embodiments, BT communications may utilize the 2.4 GHZ signal paths and may utilize the same FEM circuitry 200 as the one used for WLAN communications.

Figure 3:
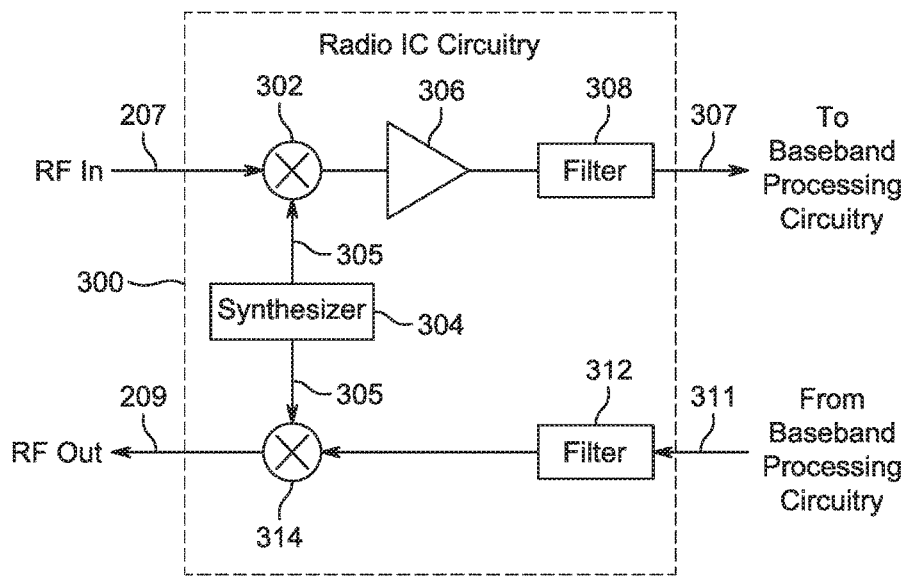
FIG. 3 illustrates a radio IC circuitry for use in the radio architecture of FIG. 1, in accordance with some embodiments.

FIG. 3 illustrates radio IC circuitry 300 in accordance with some embodiments. The radio IC circuitry 300 is one example of circuitry that may be suitable for use as the WLAN or BT radio IC circuitry 106a/106b (FIG. 1), although other circuitry configurations may also be suitable.

In some embodiments, the radio IC circuitry 300 may include a receive signal path and a transmit signal path. The receive signal path of the radio IC circuitry 300 may include at least mixer circuitry 302, such as, for example, down-conversion mixer circuitry, amplifier circuitry 306 and filter circuitry 308. The transmit signal path of the radio IC circuitry 300 may include at least filter circuitry 312 and mixer circuitry 314, such as, for example, up-conversion mixer circuitry. Radio IC circuitry 300 may also include synthesizer circuitry 304 for synthesizing a frequency 305 for use by the mixer circuitry 302 and the mixer circuitry 314. The mixer circuitry 302 and/or 314 may each, according to some embodiments, be configured to provide direct conversion functionality. The latter type of circuitry presents a much simpler architecture as compared with standard super-heterodyne mixer circuitries, and any flicker noise brought about by the same may be alleviated for example through the use of OFDM modulation. FIG. 3 illustrates only a simplified version of a radio IC circuitry, and may include, although not shown, embodiments where each of the depicted circuitries may include more than one component. For instance, mixer circuitry 302 and/or 314 may each include one or more mixers, and filter circuitries 308 and/or 312 may each include one or more filters, such as one or more BPFs and/or LPFs according to application needs. For example, when mixer circuitries are of the direct-conversion type, they may each include two or more mixers.

In some embodiments, mixer circuitry 302 may be configured to down-convert RF signals 207 received from the FEM circuitry 104 (FIG. 1) based on the synthesized frequency 305 provided by synthesizer circuitry 304. The amplifier circuitry 306 may be configured to amplify the down-converted signals and the filter circuitry 308 may include a LPF configured to remove unwanted signals from the down-converted signals to generate output baseband signals 307. Output baseband signals 307 may be provided to the baseband processing circuitry 108 (FIG. 1) for further processing. In some embodiments, the output baseband signals 307 may be zero-frequency baseband signals, although this is not a requirement. In some embodiments, mixer circuitry 302 may comprise passive mixers, although the scope of the embodiments is not limited in this respect.

In some embodiments, the mixer circuitry 314 may be configured to up-convert input baseband signals 311 based on the synthesized frequency 305 provided by the synthesizer circuitry 304 to generate RF output signals 209 for the FEM circuitry 104. The baseband signals 311 may be provided by the baseband processing circuitry 108 and may be filtered by filter circuitry 312. The filter circuitry 312 may include a LPF or a BPF, although the scope of the embodiments is not limited in this respect.

In some embodiments, the mixer circuitry 302 and the mixer circuitry 314 may each include two or more mixers and may be arranged for quadrature down-conversion and/or up-conversion respectively with the help of synthesizer 304. In some embodiments, the mixer circuitry 302 and the mixer circuitry 314 may each include two or more mixers each configured for image rejection (e.g., Hartley image rejection). In some embodiments, the mixer circuitry 302 and the mixer circuitry 314 may be arranged for direct down-conversion and/or direct up-conversion, respectively. In some embodiments, the mixer circuitry 302 and the mixer circuitry 314 may be configured for super-heterodyne operation, although this is not a requirement.

Mixer circuitry 302 may comprise, according to one embodiment: quadrature passive mixers (e.g., for the in-phase (I) and quadrature phase (Q) paths). In such an embodiment, RF input signal 207 from FIG. 3 may be down-converted to provide I and Q baseband output signals to be sent to the baseband processor Quadrature passive mixers may be driven by zero and ninety degree time-varying LO switching signals provided by a quadrature circuitry which may be configured to receive a LO frequency (fLO) from a local oscillator or a synthesizer, such as LO frequency 305 of synthesizer 304 (FIG. 3). In some embodiments, the LO frequency may be the carrier frequency, while in other embodiments, the LO frequency may be a fraction of the carrier frequency (e.g., one-half the carrier frequency, one-third the carrier frequency). In some embodiments, the zero and ninety degree time-varying switching signals may be generated by the synthesizer, although the scope of the embodiments is not limited in this respect.

In some embodiments, the LO signals may differ in duty cycle (the percentage of one period in which the LO signal is high) and/or offset (the difference between start points of the period). In some embodiments, the LO signals may have a 25% duty cycle and a 50% offset. In some embodiments, each branch of the mixer circuitry (e.g., the in-phase (I) and quadrature phase (Q) path) may operate at a 25% duty cycle, which may result in a significant reduction is power consumption.

The RF input signal 207 (FIG. 2) may comprise a balanced signal, although the scope of the embodiments is not limited in this respect. The I and Q baseband output signals may be provided to low-nose amplifier, such as amplifier circuitry 306 (FIG. 3) or to filter circuitry 308 (FIG. 3).

In some embodiments, the output baseband signals 307 and the input baseband signals 311 may be analog baseband signals, although the scope of the embodiments is not limited in this respect. In some alternate embodiments, the output baseband signals 307 and the input baseband signals 311 may be digital baseband signals. In these alternate embodiments, the radio IC circuitry may include analog-to-digital converter (ADC) and digital-to-analog converter (DAC) circuitry.

In some dual-mode embodiments, a separate radio IC circuitry may be provided for processing signals for each spectrum, or for other spectrums not mentioned here, although the scope of the embodiments is not limited in this respect.

In some embodiments, the synthesizer circuitry 304 may be a fractional-N synthesizer or a fractional N/N+1 synthesizer, although the scope of the embodiments is not limited in this respect as other types of frequency synthesizers may be suitable. For example, synthesizer circuitry 304 may be a delta-sigma synthesizer, a frequency multiplier, or a synthesizer comprising a phase-locked loop with a frequency divider. According to some embodiments, the synthesizer circuitry 304 may include digital synthesizer circuitry. An advantage of using a digital synthesizer circuitry is that, although it may still include some analog components, its footprint may be scaled down much more than the footprint of an analog synthesizer circuitry. In some embodiments, frequency input into synthesizer circuity 304 may be provided by a voltage controlled oscillator (VCO), although that is not a requirement. A divider control input may further be provided by either the baseband processing circuitry 108 (FIG. 1) or the application processor 111 (FIG. 1) depending on the desired output frequency 305. In some embodiments, a divider control input (e.g., N) may be determined from a look-up table (e.g., within a Wi-Fi card) based on a channel number and a channel center frequency as determined or indicated by the application processor 111.

In some embodiments, synthesizer circuitry 304 may be configured to generate a carrier frequency as the output frequency 305, while in other embodiments, the output frequency 305 may be a fraction of the carrier frequency (e.g., one-half the carrier frequency, one-third the carrier frequency). In some embodiments, the output frequency 305 may be a LO frequency (fLO).

Figure 4:
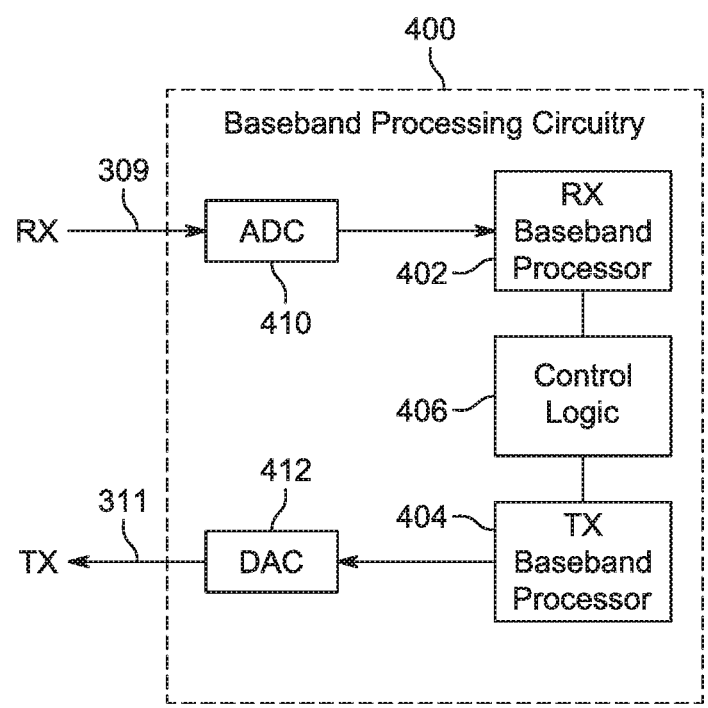
FIG. 4 illustrates a baseband processing circuitry for use in the radio architecture of FIG. 1, in accordance with some embodiments.

FIG. 4 illustrates a functional block diagram of baseband processing circuitry 400 in accordance with some embodiments. The baseband processing circuitry 400 is one example of circuitry that may be suitable for use as the baseband processing circuitry 108 (FIG. 1), although other circuitry configurations may also be suitable. The baseband processing circuitry 400 may include a receive baseband processor (RX BBP) 402 for processing receive baseband signals 309 provided by the radio IC circuitry 106 (FIG. 1) and a transmit baseband processor (TX BBP) 404 for generating transmit baseband signals 311 for the radio IC circuitry 106. The baseband processing circuitry 400 may also include control logic 406 for coordinating the operations of the baseband processing circuitry 400.

In some embodiments (e.g., when analog baseband signals are exchanged between the baseband processing circuitry 400 and the radio IC circuitry 106), the baseband processing circuitry 400 may include ADC 410 to convert analog baseband signals received from the radio IC circuitry 106 to digital baseband signals for processing by the RX BBP 402. In these embodiments, the baseband processing circuitry 400 may also include DAC 412 to convert digital baseband signals from the TX BBP 404 to analog baseband signals.

In some embodiments that communicate OFDM signals or OFDMA signals, such as through baseband processor 108a, the transmit baseband processor 404 may be configured to generate OFDM or OFDMA signals as appropriate for transmission by performing an inverse fast Fourier transform (IFFT). The receive baseband processor 402 may be configured to process received OFDM signals or OFDMA signals by performing an FFT. In some embodiments, the receive baseband processor 402 may be configured to detect the presence of an OFDM signal or OFDMA signal by performing an autocorrelation, to detect a preamble, such as a short preamble, and by performing a cross-correlation, to detect a long preamble. The preambles may be part of a predetermined frame structure for Wi-Fi communication.

Referring back to FIG. 1, in some embodiments, the antennas 101 (FIG. 1) may each comprise one or more directional or omnidirectional antennas, including, for example, dipole antennas, monopole antennas, patch antennas, loop antennas, microstrip antennas or other types of antennas suitable for transmission of RF signals. In some multiple-input multiple-output (MIMO) embodiments, the antennas may be effectively separated to take advantage of spatial diversity and the different channel characteristics that may result. Antennas 101 may each include a set of phased-array antennas, although embodiments are not so limited.

Although the radio-architecture 100 is illustrated as having several separate functional elements, one or more of the functional elements may be combined and may be implemented by combinations of software-configured elements, such as processing elements including digital signal processors (DSPs), and/or other hardware elements. For example, some elements may comprise one or more microprocessors, DSPs, field-programmable gate arrays (FPGAs), application specific integrated circuits (ASICs), radio-frequency integrated circuits (RFICs) and combinations of various hardware and logic circuitry for performing at least the functions described herein. In some embodiments, the functional elements may refer to one or more processes operating on one or more processing elements.

Figure 5:
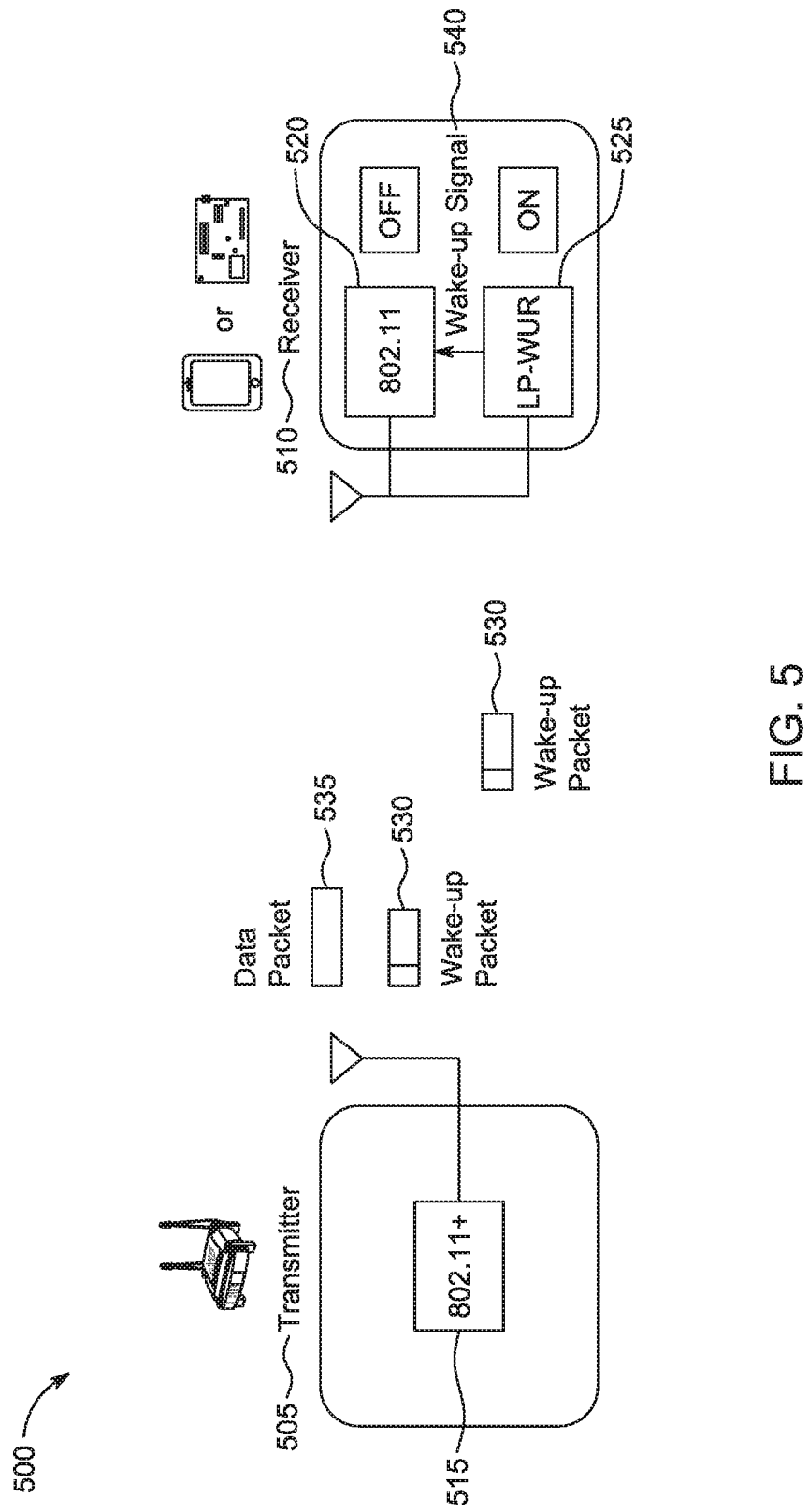
FIG. 5 illustrates an example system in which a low-power wake-up receiver (LP-WUR) is operated, in accordance with some embodiments.

FIG. 5 illustrates an example system 500 in which a low-power wake-up receiver (LP-WUR) is operated. As shown, the system 500 includes a transmitter 505 and a receiver 510. The transmitter 505 may be a WLAN access point (e.g., Wi-Fi router) and the receiver 510 may be a WLAN station or a computing device capable of connecting to the WLAN access point, such as a mobile phone, a tablet computer, a laptop computer, a desktop computer, and the like. The transmitter 505 includes an WLAN (802.11+) radio 515. The receiver 510 includes a WLAN (802.11) radio 520 (e.g., Wi-Fi radio) and a LP-WUR 525. The WLAN radio 515 of the transmitter 505 transmits one or more wake-up packets 530. One of the wake-up packets 530 is received at the LP-WUR 525 of the receiver 510. Upon receiving the wake-up packet 530, the LP-WUR 525 sends a wake-up signal 540, which causes the WLAN radio 520 of the receiver 510 to turn on. The WLAN radio 515 of the transmitter 505 transmits data packet(s) 535 to the WLAN radio 520 of the receiver 510, and the WLAN radio 520 of the receiver 510 receives the data packet(s) 535.

As illustrated in FIG. 5, LP-WUR relates to a technique to enable ultra-low power operation for a Wi-Fi device (e.g., receiver 510). The idea is for the device to have a minimum radio configuration (e.g., LP-WUR 525) that can receive a wake-up packet 530 from the peer (e.g., transmitter 505). Hence, the device can stay in low power mode until receiving the wake-up packet 530.

The receiver 510 of the wake-up packet 530 may negotiate with the transmitter 505 of wake-up packet 530 before the receiver 510 enables the LP-WUR mode. Hence, the transmitter 505 knows the agreed band and channel in which to transmit the wake-up packet, the identification in the wake-up packet, and other related information. In some cases, the transmitter 505 may also send a response frame with information to the receiver 510 before the receiver 510 enables the LP-WUR mode. Some examples of the negotiation method are discussed in this document.

For the LP-WUR technology to work, the transmitter 505 and the receiver 510 may agree on a common frequency band and channel for the wake-up receiver 525. The negotiation may happen in the band and channel used by the WLAN radio 515/520 communication between the transmitter 505 and the receiver 520 to transmit the data frame (e.g., data packet 535).

For example, for a STA that associates with an AP on a specific band and channel, the negotiation for the band and channel of the wake-up radio is required before the STA turns off the WLAN radio (or enters the WUR mode) and relies on the AP to send the wake-up packet to wake up the STA. A technique for the AP to change the channel of the WUR may also be desirable.

Figure 6:
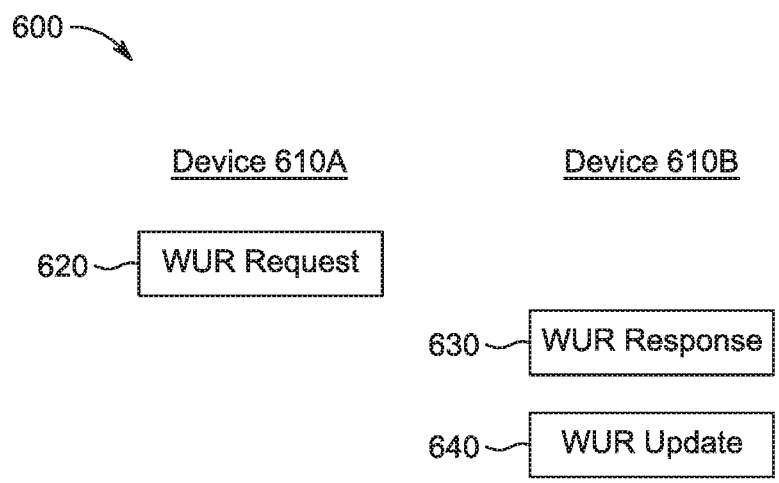
FIG. 6 illustrates a flow chart of an example method for band and channel negotiation, in accordance with some embodiments.

FIG. 6 illustrates a flow chart of an example method 600 for band and channel negotiation, in accordance with some embodiments. The method 600 is implemented with device 610A and device 610B. According to some examples, the device 610A enters the WUR mode after negotiation with the device 610B. Device 610B transmits wake-up packets to wake up the WLAN radio of device 610A. In some cases, the device 610A corresponds to the receiver 510, which includes the WLAN radio 520 and the LP-WUR 525. In some cases, the device 610B corresponds to the transmitter 505, which includes the WLAN radio 515. The device 610B may be an AP and the device 610A may be a STA.

As shown in FIG. 6, at operation 620, the device 610A sends a WUR request. According to a first option, at operation 620, the device 610A indicates that it is operating in the same band, operating class, and channel of the WLAN radio in the WUR request.

At operation 630, the device 610B sends a WUR response. According to the first option, the WUR response indicates acceptance of the band, operating class, and channel in the WUR request. According to a second option, at operation 620, the device 610A indicates one band, suggests several bands or includes its band capability in the WUR request. At operation 630, the device 610B responds with an accepted band, operating class, and channel in the WUR response. In other words, the device 610A indicates one band or suggests several bands that are indicated as capable by the device 610B. The device 610B accepts the band that is indicated as capable by the device 610A. The device 610B accepts the band that is suggested by the device 610A.

At operation 640, the device 610B sends a WUR update. In some cases, the operation 640 may not be implemented at all, and there may be no WUR update. Alternatively, the operation 640 may be implemented multiple times and there may be multiple WUR updates. The WUR update of operation 640 updates the band, channel, and operating class of the WUR radio. The device 610B sends the WUR update. The device 610B may indicate a new band, operating class, and channel. The device 610B may indicate a band that is indicated as capable by the device 610A. The device 610B may indicate a band that is suggested by the device 610A.

According to some embodiments, in the operations 620-630, the device 610A indicates if it is capable of operating in a different band, channel, or operating class of the WLAN radio. The device 610A indicates its capable band, channel, and operating class. The device 610B indicates its capable band, channel, and operating class. The indications of capable band, channel, and operating class are separate for the device 610A and the device 610B. In some cases, the capability is included in a WUR capability element. The WUR capability element may be included in a beacon, a negotiation frame (WUR request/response) or any management frame.

According to some aspects, the subject technology introduces a signaling and negotiation procedure for a transmitter and a receiver of wake-up packets to negotiate the band, channel, and operating class for the wake-up receiver. The negotiation procedure includes procedures to agree on a common band and channel and to update the agreed upon common band and channel.

The signaling may have several parts including: band capability for the wake-up radio being announced by the device 610B; channel and operating class capability being announced by the device 610B; capability for operating in a different channel if the wake-up radio and the main radio operate in the same band from the device 610A and the device 610B; signaling from the device 610A to indicate the band that should be used by the device 610A and the device 610B for transmitting and receiving wake-up packet(s); and signaling from device 610B to indicate the operating class and the channel that should be used by the device 610A and the device 610B for transmitting and receiving wake-up packet(s). In some aspects, the negotiation procedure has two parts: the device 610A determines the band used by the wake-up radio; and the device 610B determines the channel and operating class used by the wake-up radio. In some cases, the wake-up radio uses the same channel as the WLAN radio if the wake-up radio and the WLAN radio are in the same band.

According to some examples, the device 610A enters the WUR mode after negotiating with the device 610B (e.g., an AP), which is to transmit the wake-up packet to wake up the WLAN radio of the device 610A. Signaling to negotiate the band, operating class, and channel of the wake-up receiver between the device 610A and the device 610B is desirable.

According to one solution, the device 610A and the device 610B use the same band, operating class, and channel used by the WLAN radio for the wake-up receiver. However, in some cases, this may not be sufficient. In one example, the WLAN of the device 610A (e.g., the STA) is 2.4 GHz and 5 GHz band capable. However, the device 610A is only able to support the wake-up receiver on the 2.4 GHz band. In some cases, the device 610A associates with the device 610B (e.g., the AP) to transmit data on the 5 GHz band. However, the wake-up receiver of the device 610A cannot operate in the 5 GHz band and can operate in the 2.4 GHz band.

In some cases, an LP-WUR power save frame is used for negotiation between the device 610A and the device 610B. The power save frame is associated with an operating class and a channel. However, there is no band identification (ID). Also, the device 610A and the device 610B may agree on the operating class and the channel. In some cases, the device 610A is not able to determine the channel without receiving information from the device 610B. For instance, in the example above, the device 610A has a 2.4 GHz band wake-up receiver but is associated with the device 610B using the 5 GHz band of its WLAN radio. The AP device 610B may be dual concurrent on the 2.4 GHz and 5 GHz bands and may serve another STA (different from the device 610A) on the 2.4 GHz band. The AP device 610B may attempt to use the same band and channel as the WLAN radio for the wake-up receiver of the STA device 610A. However, the STA device 610A is not capable of receiving WUR communication on the 5 GHz band, which it uses for WLAN communication with the AP device 610B.

According to some examples, the device 610A enters the WUR mode after negotiating with the device 620B, which is to transmit the wake-up packet to the LP-WUR of the device 610A to wake up the WLAN radio of the device 610A. The negotiation process includes negotiation frame exchange between the device 610A and the device 610B through the WLAN radios of the two devices.

In some cases, a device 610A or 610B may only have wake-up receiver capability or wake-up transmitter capability. For example, the device 610B may only have wake-up transmitter capability and the device 610A may only have wake-up receiver capability. As used herein, a wake-up radio may include either a wake-up receiver, a wake up-transmitter or both.

In some cases, the band, operating class, and channel are signaled in the negotiation frame transmitted by the device 610A and the device 610B using their WLAN radios. In some cases, signaling for supported bands are included in the WUR capability element. For the devices 610A and 610B, the WUR capability element may be included in a beacon or a management frame.

In some cases, signaling for the channel and operating class of the supported band are included in the WUR band capability announcement. For the device 610B, the channel and the operating class of the supported band are included in the WUR capability element that can be included in the beacon or the management frame. In some cases, the capability for operating in different channels if the wake up radio and main radio operate in the same band are included in the WUR capability element. For the devices 610A and 610B, the WUR capability element may be included in the beacon or the management frame. The baseline is that every device supports operating the WUR and the WLAN radio in the same band and channel.

For the negotiation frame transmitted by the device 610A or the device 610B, signaling for using the same band and channel used to transmit the negotiation frame are included within the negotiation frame. In some cases, a request signaling to change the band, operating class, or channel may be included in the negotiation frame. In some cases, an indication to allow or disallow use of a different channel for the WLAN radio and the LP-WUR operating in the same band may be included in the negotiation frame.

In some cases, a negotiation frame is used by the devices 610A and 610B to agree on the band, operating class, and channel for the WUR. In some examples, the suggestion for the band, operating class, and channel is to be supported by the peer device based on a capability indicated by the peer device.

In some examples, the device 610A suggests the band used by the devices 610A and 610B or the WUR. The device 610A may suggest multiple available bands. The suggested bands may be indicated explicitly in the negotiation frame sent from the device 610A to the device 610B. One of the suggested bands may be indicated implicitly based on the band used by the device 610A to send the negotiation frame to the device 610B. The device 610A may suggest the channel and the operating class used by the devices 610A and 610B for the WUR. The device 610A may be limited to have no suggestions or to only suggest using the same channel and operating class used by the device 610A to send the negotiation frame. The suggested operating class and channel may be indicated explicitly in the negotiation frame sent by the device 610A to the device 610B. Also or alternatively, the suggested operating class and channel may be indicated implicitly based on the operating class and channel used by the device 610A to transmit the negotiation frame to the device 610B.

In some examples, the device 610B decides the band, operating class, and channel used by the devices 610A and 610B for the WUR. If the device 610A suggests band for use by the WUR, the band selected by the device 610B is one of the suggested bands. If the device 610A suggests channels and operating classes for use by the WUR, the channel and the operating class selected by the device 610B is one of the suggested channels and operating classes. The device 610B can reject the negotiation frame from the device 610A if the selected channel or operating class or band from the device 610A does not work for the device 610B. In this case, in the response frame that indicates the rejection, the device 610B can indicate the preferred channel. In some implementations, a rule is added such that if the WUR and the WLAN radio operate in the same band, the device 610B uses the same channel for the WUR and for the WLAN radio.

In some examples, the device 610B decides the operating class and the channel used by the devices 610A and 610B for the WUR. This is useful if the device 610A suggests the band used by the devices 610A and 610B for the WUR. If the device 610A suggests channels and operating classes for use by the WUR, the channel and the operating class selected by the device 610B for the WUR may be one of the suggested channels and operating classes. The device 610B may reject the negotiation frame from the device 610A if the suggested channels or operating classes do not work for the device 610B. In some implementations, a rule is added such that if the WUR and the WLAN radio operate in the same band, the device 610B uses the same channel for the WUR and for the WLAN radio.

According to some implementations, once the devices 610A and 610B finish the negotiation, the device 610B is allowed to change the channel and the operating class of the WUR. The device 610B may indicate to the device 610A its request for changing the channel and the operating class. The indication may be in a negotiation frame, a beacon, or a management frame. The new band, operating class, and channel are included in the frame with the indication. The device 610A may check the beacon for the WUR channel after the channel switching and before turning off its WLAN radio. The device 610A may reject the request by sending a negotiation frame to the device 610B. If the device 610A rejects the request, the device 610B may later send a frame to terminate the previously negotiated WUR operation. This procedure may be used when the bands used by the WLAN radio and the WUR are different.

If the devices 610A and 610B use the same channel for the WUR and the WLAN radio, the device 610B can indicate the channel and the operating class for the WUR and for the WLAN radio. If the device 610B changes the channel of the WLAN radio, there might not be a separate indication for changing the channel of the WUR provided to the device 610A from the device 610B.

In a first example implementation, a dual concurrent AP operates on 5 GHz channel 149 and 2.4 GHz channel 6 for WLAN radios. A STA associates with the AP on 5 GHz. The AP announces the WUR capability in the beacon. The WUR capability indicates that the AP is capable of operating the WUR on 2.4 GHz channel 6 and 5 GHz channel 149. The STA receives the beacon and knows the WUR capability of the AP. The STA sends the WUR request to the AP and indicates the band 2.4 GHz for the WUR. The AP sends the WUR response to the STA to accept the WUR request. The AP and the STA operate the WUR on 2.4 GHz channel 6. The channel is determined by the announced capability from the AP.

In a second example implementation, an AP operates on 2.4 GHz channel 6 for its WLAN radio. A STA associates with the AP on 2.4 GHz. The AP announces the WUR capability in the beacon. The WUR capability indicates that the AP is capable of operating the WUR on 2.4 GHz. The STA receives the beacon from the AP and knows the WUR capability of the AP. The STA sends the WUR request to the AP and suggests 2.4 GHz and channel 6 for the WUR. The AP sends the WUR response to the STA to accept the WUR request. The AP and the STA operate the WUR on 2.4 GHz channel 6.

In a third example implementation, an AP operates on 2.4 GHz channel 6 for its WLAN radio. A STA associates with the AP on 2.4 GHz. The AP announces WUR capability in the beacon. The WUR capability indicates that the AP is capable of operating the WUR on 2.4 GHz. The STA receives the beacon from the AP and knows the WUR capability of the AP. The STA sends the WUR request to the AP the WUR request indicates that the WUR uses the same band and channel as the WLAN radio. The AP sends the WUR response to the STA to accept the WUR request. The AP and the STA operate the WUR on 2.4 GHz channel 6.

Aspects of the subject technology are described below using various numbered examples. The numbered examples do not limit the subject technology.

Example 1 is an apparatus of a first wireless device, the apparatus comprising: memory; and processing circuitry, the processing circuitry to: decode an indication of multiple available bands for wake-up radio (WUR) communication from a second wireless device; select, from among the multiple available bands, a band for WUR communication between the first wireless device and the second wireless device, encode, for transmission to the second wireless device, an indication of the selected band for WUR communication; decode an indication of an operating class and a channel, within the selected band, for WUR communication, the indication of the operating class and the channel received from the second wireless device; and decode a wake-up packet received via the WUR in the selected band, the operating class, and the channel.

Example 2 is the apparatus of Example 1, wherein the multiple available bands are indicated in a negotiation frame, a management frame or a beacon received from the second wireless device.

Example 3 is the apparatus of Example 2, wherein one of the multiple available bands is identified based on a band used to receive the negotiation frame.

Example 4 is the apparatus of Example 1, the processing circuitry further to: decode an indication of WUR capability from the second wireless device, the indication of WUR capability comprising the indication of the multiple available bands for WUR communication.

Example 5 is the apparatus of Example 1, wherein the first wireless device comprises a station (STA) and the second wireless device comprises an access point (AP).

Example 6 is the apparatus of Example 1, the processing circuitry further to: encode, for transmission to the second wireless device, of an indication of available operating classes and channels within the selected band, wherein the operating class and the channel for WUR communication are selected from among the available operating classes and channels.

Example 7 is the apparatus of Example 1, wherein the multiple available bands comprise a 5 GHz band and a 2.4 GHz band.

Example 8 is the apparatus of Example 1, the processing circuitry further to: wake up a wireless local area network (WLAN) radio at the first wireless device in response to decoding the wake-up packet; and decode a data packet received via the WLAN radio.

Example 9 is the apparatus of Example 1, the processing circuitry further to: select, in response to determining that the band for WUR communication is to be updated and from among the multiple available bands, an updated band for WUR communication between the first wireless device and the second wireless device; encode, for transmission to the second wireless device, an indication of the updated band for WUR communication; decode an indication of an updated operating class and an updated channel, within the updated band, for WUR communication from the second wireless device; and decode a new wake-up packet received via the WUR in the updated band, the updated operating class, and the updated channel to communicate with the second wireless device.

Example 10 is the apparatus of Example 1, further comprising transceiver circuitry to: receive the indication of the multiple available bands; and transmit the indication of the selected band; and receive the indication of the operating class and the channel.

Example 11 is the apparatus of Example 10, further comprising an antenna coupled to the transceiver circuitry.

Example 12 is an apparatus of a first wireless device, the apparatus comprising: memory; and processing circuitry, the processing circuitry to: encode, for transmission to a second wireless device, an indication of multiple available bands for wake-up radio (WUR) communication; decode an indication, received from the second wireless device, of a band, selected from among the multiple available bands, for WUR communication with the second wireless device; encode, for transmission to the second wireless device, an indication of an operating class and a channel, within the selected band, for WUR communication; and encode a wake-up packet in the selected band, the operating class, and the channel for transmission to the second wireless device.

Example 13 is the apparatus of Example 12, wherein the first wireless device comprises an access point (AP) and the second wireless device comprises a station (STA).

Example 14 is the apparatus of Example 12, wherein the processing circuitry is to encode the wake-up packet to wake up a wireless local area network (WLAN) radio at the second wireless device.

Example 15 is a non-transitory machine-readable medium storing instructions for execution by processing circuitry of a first wireless device, the instructions causing the processing circuitry to: decode an indication of multiple available bands for wake-up radio (WUR) communication from a second wireless device; select, from among the multiple available bands, a band for WUR communication between the first wireless device and the second wireless device; encode, for transmission to the second wireless device, an indication of the selected band for WUR communication; decode an indication of an operating class and a channel, within the selected band, for WUR communication, the indication of the operating class and the channel from the second wireless device; and decode a wake-up packet received via the WUR in the selected band, the operating class, and the channel.

Example 16 is the machine-readable medium of Example 15, wherein the multiple available bands are indicated in a negotiation frame, a management frame or a beacon received from the second wireless device.

Example 17 is the machine-readable medium of Example 16, wherein one of the multiple available bands is identified based on a band used to receive the negotiation frame.

Example 18 is the machine-readable medium of Example 15, the instructions further causing the processing circuitry to: decode an indication of WUR capability from the second wireless device, the indication of WUR capability comprising the indication of the multiple available bands for WUR communication.

Example 19 is the machine-readable medium of Example 15, wherein the first wireless device comprises a station (STA) and the second wireless device comprises an access point (AP).

Example 20 is a method, implemented at a first wireless device, the method comprising: decoding an indication of multiple available bands for wake-up radio (WUR) communication from a second wireless device; selecting, from among the multiple available bands, a band for WUR communication between the first wireless device and the second wireless device; encoding, for transmission to the second wireless device, an indication of the selected band for WUR communication; decoding an indication of an operating class and a channel, within the selected band, for WUR communication, the indication of the operating class and the channel received from the second wireless device; and decoding a wake-up packet received via the WUR in the selected band, the operating class, and the channel.

Example 21 is the method of Example 20, wherein the multiple available bands are indicated in a negotiation frame, a management frame or a beacon received from the second wireless device.

Example 22 is the method of Example 21, wherein one of the multiple available bands is identified based on a band used to receive the negotiation frame.

Example 23 is the method of Example 20, further comprising: decoding an indication of WUR capability from the second wireless device, the indication of WUR capability comprising the indication of the multiple available bands for WUR communication.

Example 24 is the method of Example 20, wherein the first wireless device comprises a station (STA) and the second wireless device comprises an access point (AP).

The Abstract is provided to comply with 37 C.F.R. Section 1.72(b) requiring an abstract that will allow the reader to ascertain the nature and gist of the technical disclosure. It is submitted with the understanding that it will not be used to limit or interpret the scope or meaning of the claims. The following claims are hereby incorporated into the detailed description, with each claim standing on its own as a separate embodiment.

What is claimed is:

1. An apparatus of a first wireless device, the apparatus comprising:
   memory; and
   processing circuitry, the processing circuitry to:
   decode an indication of multiple available bands for wake-up radio (WUR) communication from a second wireless device;
   select, at the first wireless device and from among the multiple available bands, a band for WUR communication between the first wireless device and the second wireless device;
   encode, for transmission to the second wireless device, an indication of the selected band for WUR communication;
   decode an indication of an operating class and a channel, within the selected band, for WUR communication, the indication of the operating class and the channel received from the second wireless device; and
   decode a wake-up packet received via the WUR in the selected band, the operating class, and the channel, wherein the first wireless device comprises a non-access point station (STA) and the second wireless device comprises an access point (AP).

2. The apparatus of claim 1, wherein the multiple available bands are indicated in a negotiation frame, a management frame or a beacon received from the second wireless device.

3. The apparatus of claim 2, wherein one of the multiple available bands is identified based on a band used to receive the negotiation frame.

4. The apparatus of claim 1, the processing circuitry further to:
   decode an indication of WUR capability from the second wireless device, the indication of WUR capability comprising the indication of the multiple available bands for WUR communication.

5. The apparatus of claim 1, the processing circuitry further to:
   encode, for transmission to the second wireless device, of an indication of available operating classes and channels within the selected band, wherein the operating class and the channel for WUR communication are selected from among the available operating classes and channels.

6. The apparatus of claim 1, wherein the multiple available bands comprise a 5 GHz band and a 2.4 GHz band.

7. The apparatus of claim 1, the processing circuitry further to:
   wake up a wireless local area network (WLAN) radio at the first wireless device in response to decoding the wake-up packet; and
   decode a data packet received via the WLAN radio.

8. The apparatus of claim 1, the processing circuitry further to:
   select, in response to determining that the band for WUR communication is to be updated and from among the multiple available bands, an updated band for WUR communication between the first wireless device and the second wireless device;
   encode, for transmission to the second wireless device, an indication of the updated band for WUR communication;
   decode an indication of an updated operating class and an updated channel, within the updated band, for WUR communication from the second wireless device; and
   decode a new wake-up packet received via the WUR in the updated band, the updated operating class, and the updated channel to communicate with the second wireless device.

9. The apparatus of claim 1, further comprising transceiver circuitry to:
   receive the indication of the multiple available bands; and
   transmit the indication of the selected band; and
   receive the indication of the operating class and the channel.

10. The apparatus of claim 9, further comprising an antenna coupled to the transceiver circuitry.

11. An apparatus of a first wireless device, the apparatus comprising:
    memory; and processing circuitry, the processing circuitry to:
    encode, for transmission to a second wireless device, an indication of multiple available bands for wake-up radio (WUR) communication;
    decode an indication, received from the second wireless device, of a band, selected at the second wireless device and from among the multiple available bands, for WUR communication with the second wireless device;

encode, for transmission to the second wireless device, an indication of an operating class and a channel, within the selected band, for WUR communication; and encode a wake-up packet in the selected band, the operating class, and the channel for transmission to the second wireless device, wherein the first wireless device comprises an access point (AP) and the second wireless device comprises a non-access point station (STA).

12. The apparatus of claim 11, wherein the processing circuitry is to encode the wake-up packet to wake up a wireless local area network (WLAN) radio at the second wireless device.

13. A non-transitory machine-readable medium storing instructions for execution by processing circuitry of a first wireless device, the instructions causing the processing circuitry to:

decode an indication of multiple available bands for wake-up radio (WUR) communication from a second wireless device;

select, at the first wireless device and from among the multiple available bands, a band for WUR communication between the first wireless device and the second wireless device;

encode, for transmission to the second wireless device, an indication of the selected band for WUR communication;

decode an indication of an operating class and a channel, within the selected band, for WUR communication, the indication of the operating class and the channel from the second wireless device; and decode a wake-up packet received via the WUR in the selected band, the operating class, and the channel, wherein the first wireless device comprises a non-access point station (STA) and the second wireless device comprises an access point (AP).

14. The machine-readable medium of claim 13, wherein the multiple available bands are indicated in a negotiation frame, a management frame or a beacon received from the second wireless device.

15. The machine-readable medium of claim 14, wherein one of the multiple available bands is identified based on a band used to receive the negotiation frame.

16. The machine-readable medium of claim 13, the instructions further causing the processing circuitry to:

decode an indication of WUR capability from the second wireless device, the indication of WUR capability comprising the indication of the multiple available bands for WUR communication.

17. A method, implemented at a first wireless device, the method comprising:

decoding an indication of multiple available bands for wake-up radio (WUR) communication from a second wireless device;

selecting, at the first wireless device and from among the multiple available bands, a band for WUR communication between the first wireless device and the second wireless device;

encoding, for transmission to the second wireless device, an indication of the selected band for WUR communication;

decoding an indication of an operating class and a channel, within the selected band, for WUR communication, the indication of the operating class and the channel received from the second wireless device; and decoding a wake-up packet received via the WUR in the selected band, the operating class, and the channel, wherein the first wireless device comprises a non-access point station (STA) and the second wireless device comprises an access point (AP).

18. The method of claim 17, wherein the multiple available bands are indicated in a negotiation frame, a management frame or a beacon received from the second wireless device.

19. The method of claim 18, wherein one of the multiple available bands is identified based on a band used to receive the negotiation frame.

20. The method of claim 17, further comprising:

decoding an indication of WUR capability from the second wireless device, the indication of WUR capability comprising the indication of the multiple available bands for WUR communication.

* * * * *